United States Patent Office 2,982,603
Patented May 2, 1961

2,982,603

PREPARATION OF ANHYDROUS CERIUM CHLORIDE, URANIUM BROMIDE, OR PLUTONIUM FLUORIDE

Kent M. Harmon, Glendale, Calif., and Edward Wichers, Washington, D.C., assignors to the United States of America as represented by the United States Atomic Energy Commission No Drawing. Filed June 24, 1947, Ser. No. 756,814

4 Claims. (Cl. 23—14.5)

This invention relates to a process of preparing anhydrous metal halides and more particularly to a process of converting metal oxalates to anhydrous metal halides.

It is desirable that a process be known for converting metallic oxalates, such as the oxalates of cerium, plutonium and uranium, to the corresponding anhydrous halides substantially free of oxyhalides. Such halides are required for the production of the corresponding metals by reaction with alkali metals and alkaline earth metals. There is a particular need for the halide conversion of an oxalate, such as plutonium oxalate, because it is formed in certain wet chemistry purification processes but it cannot conveniently be reduced directly to the metal. Consequently, a method for converting the oxalate to an anhydrous halide is needed. A method of this type is especially appropriate for conversion of the oxalate of the metals which fall into the category of the first rare earth series including the elements from lanthanum (element 57) through lutecium (element 71) as well as those elements at the end of the periodic system, thorium and higher, which by reason of the parallel to the first rare earth series in the make-up of the electron orbits is identified as a second rare earth series.

There have been some methods worked out for converting various metallic oxalates to metallic halides, for example, Robinson, "Proceedings of the Royal Society," 37, 150 (1884). However, this process has the disadvantage that difficultly reducible oxyhalides are sometimes formed and thus the final product is not pure, and low yields of metal result.

The primary object of this invention is to provide a method for quickly and efficiently preparing from hydrated metallic oxalates, anhydrous metallic halides which are free from oxyhalides.

Another object of this invention is to provide a method for preparing halides of the first and second rare earth series from the corresponding hydrated oxalates.

A further object of this invention is to provide a method for preparing rare earth halides, thorium halides, uranium halides and transuranic halides from the corresponding hydrated oxalates.

A still further object of this invention is to provide a method for preparing pure cerous chloride from hydrated cerous oxalate.

Still further objects and advantages of this invention will appear from the following description.

The objects of this invention are achieved by the step of saturating the oxalate of a metal with a dry hydrohalide while the oxalate is at a temperature below 100° C. before the high temperature conversion of oxalate to the halide.

It is important that the temperature be maintained below 100° C. at room pressure during the saturation with the hydrohalide or oxyhalides may form during the saturation step. This is particularly true if the amount of moisture present is large. Temperatures as high as 100° C. may be used but in the preferred embodiment of the method of this invention the temperature is maintained below the temperature at which the vapor pressure of water is about equal to the external pressure, e.g. at about 80 to 90° C. at normal atmospheric pressure.

The following examples are given for the purpose of illustration but are not intended to be limiting on the spirit or scope of the method of the invention:

*Example I*

37.8 grams of hydrated cerous oxalate is air-dried at room temperature. It is transferred to a tube and heated dry hydrogen chloride gas is passed over it until no more gas is absorbed. The temperature of the hydrogen chloride gas is carefully controlled at 80° C. and is not allowed to exceed 90° C. When absorption is complete the current of gas is continued while the temperature is raised rather rapidly to 275° C. This temperature is maintained until the evolution of water stops. Thereafter the temperature is raised gradually to the neighborhood of 450–500° C. During this interval a small amount of additional water usually appears. The temperature is finally raised to about 750° C. and held there until the salt is perfectly white. A grey color, which is thought to be caused by carbon formed from the decomposition of the oxalate, may appear during the intermediate stage of heating but it may be cleared up by adding a little carbon dioxide to the hydrohalide or by a somewhat longer treatment with hydrogen chloride. The time required to produce anhydrous cerous chloride by this method is eight to ten hours. A yield of 25.2 grams of cerous chloride that is free of oxychloride is obtained. The yield depends somewhat on operating conditions but approaches the theoretical value.

The method of this invention of saturating the hydrated oxalate with a hydrohalide at a temperature not exceeding 100° C. before the high temperature conversion of the oxalate to the halide may be applied to other metal oxalates, including lanthanum oxalate, thorium oxalate, uranium oxalate, neptunium oxalate, plutonium oxalate, curium oxalate, americium oxalate, and the other oxalates of the first and second series of rare earths. When so carried out it will prevent the formation of undesirable oxyhalides thus causing the formation of a purer product.

The following example is one such embodiment of the method of the invention.

*Example II*

A one gram slurry of hydrated plus three plutonium oxalate is partially dried by passing air over it at a temperature of about 50° C. The drying of the slurry proceeds rapidly because plutonium plus three oxalate is very insoluble in water and hence water present is substantially at its normal vapor pressure.

The dry oxalate is heated to a temperature of 80° C. Dry hydrogen bromide vapor is passed over the plutonium oxalate until the absorption is complete. This usually requires about forty minutes. The temperature of the oxalate is then raised in 50° C. increments every ten minutes to 275° C. and maintained at this value for two hours while the flow of the hydrogen bromide is continued.

The temperature is then gradually increased to 400° C. and maintained at this value for one hour and then the temperature is gradually increased to 550° C. and maintained at this level for another hour.

In the event the decomposition of oxalate causes the formation of carbon on the plutonium compound it may be removed in a manner similar to that used in Example I, i.e. by the addition of a little carbon dioxide to the hydrogen bromide or by a somewhat longer treatment with the hydrogen bromide to obtain complete conversion to the plutonium tribromide.

When the plutonium oxalate is converted in accordance with this invention no oxybromide is formed and the conversion to plutonium tribromide is one hundred percent complete. It is possible similarly to prepare uranium tribromide by treating uranium oxalate by the procedure of this example.

After the oxalates of a metal, e.g. of the first and second rare earth series, are saturated with a dry hydrohalide at a temperature below 100° C., in accordance with the present invention, salts may be obtained of various valence states depending on the oxidation condition used during the later heating. An example showing one such embodiment is as follows:

*Example III*

5 grams of plus three plutonium oxalate are dried by heating to a temperature of about 50° C. The temperature is increased to 80° C. and dry hydrogen fluoride and dry air are passed over the plutonium oxalate until absorption is complete. The temperature of the oxalate is raised to 100° C. and is then increased in 50° C. increments every ten minutes until a temperature of 600° C. is obtained. The temperature is maintained at this value for one hour. The oxalate is 100 percent converted to plutonium tetrafluoride.

Because to is possible to have many various embodiments of this invention without departing from its spirit or scope, it is to be understood that the invention is not to be limited except as indicated in the following claims.

What is claimed is:

1. In the process of preparing anhydrous cerium chloride from a hydrated oxalate of said metal, the step of saturating a hydrated oxalate of cerium with hydrogen chloride before the temperature of the said oxalate has, at any time subsequent to its isolation from contact with an aqueous system, been raised substantially above room temperature.

2. In the process of preparing anhydrous uranium bromide from a hydrated oxalate of said metal, the step of saturating a hydrated oxalate of uranium with hydrogen bromide before the temperature of the said oxalate has, at any time subsequent to its isolation from contact with an aqueous system, been raised above about 80° C.

3. In the process of preparing an anhydrous plutonium fluoride from a hydrated oxalate of plutonium, the step of saturating a hydrated oxalate of plutonium with hydrogen fluoride before the temperature of the said oxalate has, at any time subsequent to its isolation from contact with an aqueous system, been raised above about 80° C.

4. In the process of preparing an anhydrous halide selected from the class consisting of cerium chloride, uranium bromide and plutonium fluoride from a hydrated oxylate of the corresponding metal, the step of saturating a hydrated oxylate of said metal with the corresponding hydrogen halide before the temperature of said oxylate has, at any time subsequent to its isolation from contact with an aqueous system, been raised substantially above about 80° C.

References Cited in the file of this patent

Robinson Royal Soc. of London, vol. 37, 1884, pp. 150–155. (Copy in Pat. Office Library.)

Seaborg et al.: "The Actinide Elements," pages 389 and 431 (1954), which reports as bibliographic reference 54 a document by Bluestein et al., LA 116, July 28, 1944.

Johns and Moulton: AEC declassified paper No. LA-193, dated Dec. 20, 1944, 20 pages. Only copy available is that filed by assignee in Serial No. 753,568 as part of Paper No. 12 (declassified authority of letter filed Feb. 1, 1957, Paper No. 13).